United States Patent
Abdoulin

[19]

[11] Patent Number: 6,026,005
[45] Date of Patent: Feb. 15, 2000

[54] SINGLE ENDED FORWARD CONVERTER WITH SYNCHRONOUS RECTIFICATION AND DELAY CIRCUIT IN PHASE-LOCKED LOOP

[75] Inventor: Edgar Abdoulin, Woodland Hills, Calif.

[73] Assignee: International Rectifier Corp., El Segundo, Calif.

[21] Appl. No.: 09/084,768

[22] Filed: May 26, 1998

Related U.S. Application Data

[60] Provisional application No. 60/049,356, Jun. 11, 1997.

[51] Int. Cl.⁷ .................................................. H02M 7/217
[52] U.S. Cl. ................................................ 363/89; 363/127
[58] Field of Search ........................................ 363/89, 127

[56] References Cited

U.S. PATENT DOCUMENTS

| | | | |
|---|---|---|---|
| 3,582,758 | 6/1971 | Gunn | 363/127 |
| 3,940,682 | 2/1976 | Park et al. | 363/127 |
| 4,519,024 | 5/1985 | Federico et al. | 363/89 |
| 4,922,404 | 5/1990 | Ludwig et al. | 363/89 |
| 5,343,383 | 8/1994 | Shinada et al. | 363/127 |
| 5,430,640 | 7/1995 | Lee | 363/127 |
| 5,528,480 | 6/1996 | Kikinis et al. | 363/89 |
| 5,663,877 | 9/1997 | Dittli et al. | 363/89 |
| 5,734,563 | 3/1998 | Shinada | 363/127 |
| 5,774,350 | 6/1998 | Notaro et al. | 363/89 |
| 5,818,704 | 10/1998 | Martinez | 363/89 |
| 5,907,481 | 5/1999 | Svzrdjo | 363/127 |

FOREIGN PATENT DOCUMENTS

| | | | |
|---|---|---|---|
| 184963 | 6/1986 | European Pat. Off. | H02M 7/217 |
| 0503806 | 9/1992 | European Pat. Off. | G06F 1/26 |
| 0595232 | 5/1994 | European Pat. Off. | H02M 7/5387 |
| 55-109174 | 8/1980 | Japan | H02M 7/217 |
| 08154348 | 6/1996 | Japan | H02J 9/06 |

OTHER PUBLICATIONS

Kagan et. al., "Improving Power Supply Efficiency with MOSFET Synchronous Rectifiers", Jul. 1982 Powercon 9.

*Primary Examiner*—Jeffrey Sterrett
*Attorney, Agent, or Firm*—Ostrolenk, Faber, Gerb & Soffen, LLP

[57] ABSTRACT

A power converter including a switching transformer having a primary winding and a secondary winding, the secondary winding having first and second voltage nodes across which a winding voltage having a variable duty cycle and phase is impressed; a first synchronous rectifier transistor coupled from the first voltage node to a common node; a second synchronous rectifier transistor coupled from the second voltage node to the common node; and a driver circuit operable to receive the winding voltage and produce first and second drive signals to the first and second synchronous rectifier transistors, respectively, the first and second drive signals leading the phase of the winding voltage.

19 Claims, 10 Drawing Sheets

SINGLE ENDED FORWARD CONVERTER WITH SYNCHRONOUS RECTIFICATION AND DELAY CIRCUIT IN PHASE-LOCKED LOOP

CROSS REFERENCE TO RELATED APPLICATION

This application is based on and claims priority to United States Provisional Patent Application No. 60/049,356, filed Jun. 11, 1997, entitled SINGLE ENDED FORWARD CONVERTER WITH SYNCHRONOUS RECTIFICATION AND RELAY CIRCUIT IN PHASE-LOCKED LOOP.

BACKGROUND OF THE INVENTION

1. Field of the Invention

The present invention relates to a synchronizing and driving circuit for a forward converter employing a synchronous rectifier and, more particularly, to a driving circuit utilizing a phase-locked loop to control the switch timing of the synchronous rectifiers.

2. Related Art

In known forward switching power supply circuits employing synchronous rectifiers, the secondary side diodes are replaced by transistors to obtain a lower on-state voltage drop. The transistors must be biased to conduct from source to drain (for an N-channel power MOSFET) when a diode would have been conducting from anode to cathode, and conversely, must be gated to block voltage from drain to source when a diode would have been blocking from cathode to anode.

The timing of turn on/off of the transistors is critical and may become problematic because practical transistors (such as MOSFETs, IGBTs, and the like) exhibit non-zero switching times. While such transistors are turning on and/or off, the current is diverted through parallel or integral diodes, which diodes are more lossy than certain power transistors and, therefore, reduce overall converter efficiency. This problem is exacerbated when the switching frequency is increased and the transistor switching times become a larger part of the overall switching period.

Figure 1:
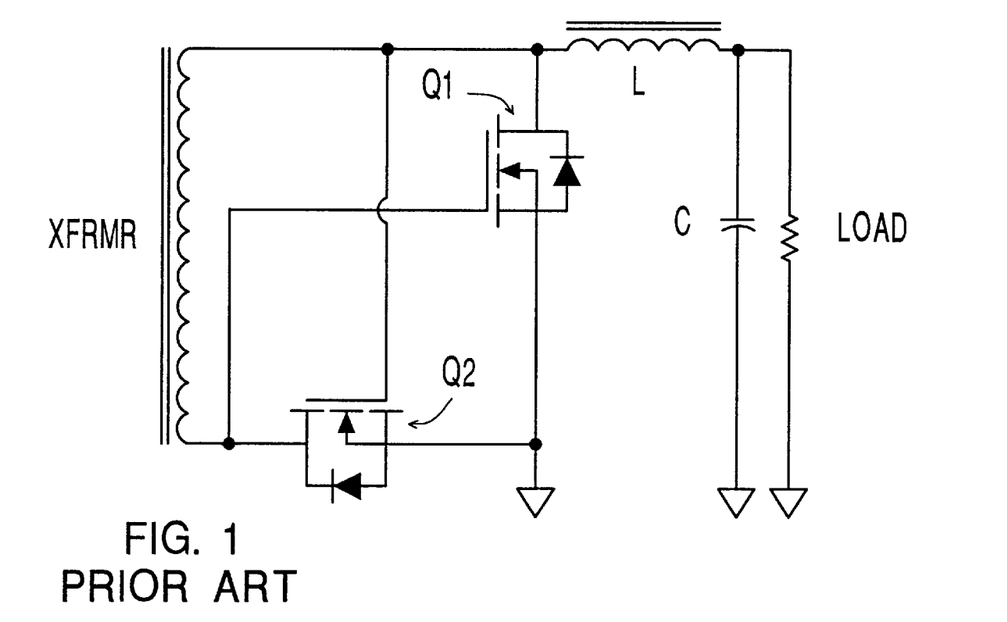
FIG. 1 is a schematic diagram of a prior art power converter employing a synchronous rectifier circuit.

With reference to FIG. 1, a known apparatus for producing the signals for gating on and off the transistors in a synchronous rectifier is shown. In FIG. 1, the synchronous rectifier transistors, Q1 and Q2, are MOSFETs which include anti-parallel diodes thereacross. As is known in the art, Q1 and Q2 are coupled to the secondary winding of a transformer, XFRMR, which drives an output LC circuit. The transistors Q1 and Q2 are connected as so-called cross-coupled switches (i.e., the gates are connected to opposite sides of the XFRMR secondary winding).

Figure 2:
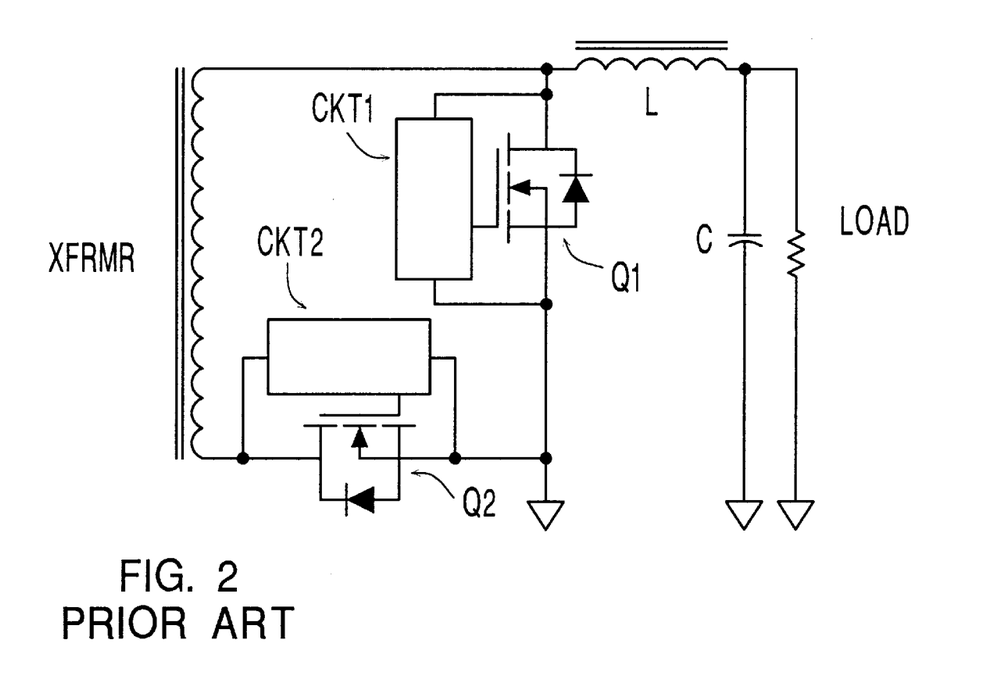
FIG. 2 is a schematic diagram of another prior art power converter employing a synchronous rectifier circuit.

FIG. 2 shows an alternative known apparatus for gating the transistors Q1 and Q2, which transistors are connected as so-called two terminal switches. In this arrangement, each power MOSFET, Q1 and Q2, is coupled to a gate circuit, CKT1 and CKT2, respectively, which detects the voltage across the transistor and gates the transistor accordingly.

Other methods of producing the gating signals for the synchronous rectifiers include stand alone linear circuits to sense changes in transformer output voltage and, as described in related U.S. Pat. No. 5,818,704 filed on Apr. 17, 1997 and assigned to the International Rectifier Corporation, circuits which sense inductor signals to produce the gating signals.

The circuits of FIGS. 1 and 2 and the stand alone circuits to sense changes in transformer output voltage suffer from the disadvantage that transformer delays (due to leakage inductance), noise (due to transformer resetting) and limits on device switching times reduce the precision in switching the synchronous rectifiers and, therefore, reduce converter efficiency.

Accordingly, there is a need in the art for a new method and apparatus for producing the gating signals for the synchronous rectifiers in a power converter which does not exhibit the deficiencies as the prior art.

SUMMARY OF THE INVENTION

In order to overcome the disadvantages of the prior art, the power converter of the present invention includes a switching transformer having a primary winding and a secondary winding, the secondary winding having first and second voltage nodes across which a winding voltage having a variable duty cycle and phase is impressed; a first synchronous rectifier transistor coupled from the first voltage node to a common node; a second synchronous rectifier transistor coupled from the second voltage node to the common node; and a driver circuit operable to receive the winding voltage and produce first and second drive signals to the first and second synchronous rectifier transistors, respectively, the first and second drive signals leading the phase of the winding voltage.

Other features and advantages of the present invention will become apparent from the following description of the invention which refers to the accompanying drawings.

BRIEF DESCRIPTION OF THE DRAWINGS

For the purpose of illustrating the invention, there is shown in the drawing forms which are presently preferred, it being understood, however, that the invention is not limited to the precise arrangements and instrumentalities shown.

DETAILED DESCRIPTION OF THE INVENTION

Figure 3:
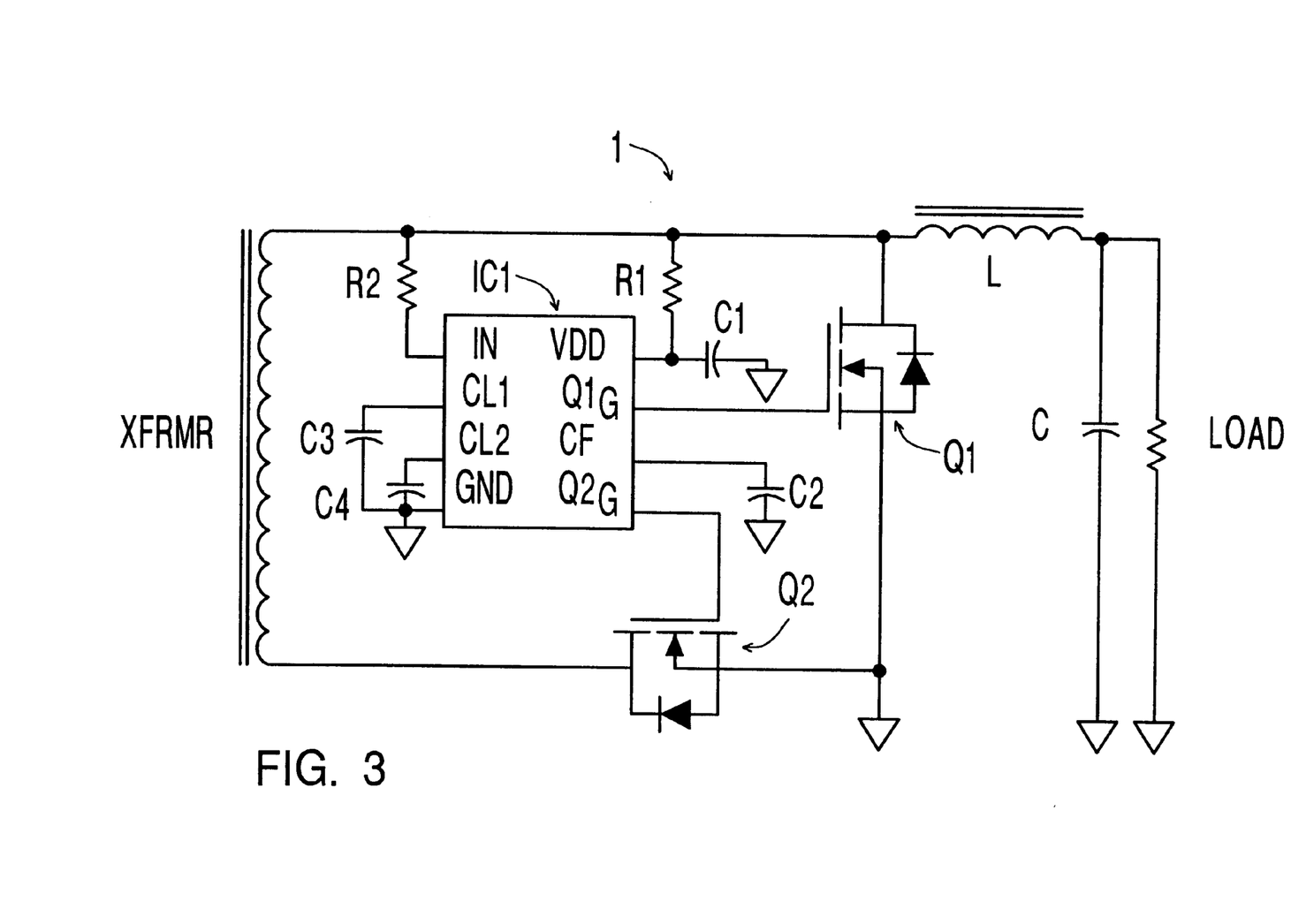
FIG. 3 is a schematic diagram of a power converter employing a synchronous rectifier circuit in accordance with one aspect of the present invention.

Referring now to the drawings wherein like numerals indicate like elements, there is shown in FIG. 3 a schematic diagram of a power converter 1 employing a synchronous rectifier circuit in accordance with a first aspect of the present invention. The converter 1 includes a pair of MOSFET transistors, Q1 and Q2, used as synchronous rectifiers which are connected to the secondary winding of a transformer, XFRMR. It is noted that other types of transistors Q1, Q2 may be employed (for example, IGBTs) which still fall within the scope of the invention.

The converter 1 also includes a gate driving circuit, IC1, which has IN, CL1, CL2, GND, Vdd, Q1g, CF, and Q2g terminals and is preferably in integrated form. IC1 takes input from the XFRMR winding through R2 to the IN terminal and ground. Capacitors C3 and C4 are used in adjusting for certain switching frequencies of the converter 1. IC1 takes operating power from the XFRMR winding through R1 and employs C1 as an energy storage device. Terminals Q1g and Q2g are coupled to the gates of Q1 and Q2, respectively, for providing gate signals thereto. Capacitor C2 may be provided to adjust the amount of phase lead of a phase-locked loop (described below).

Figure 4:
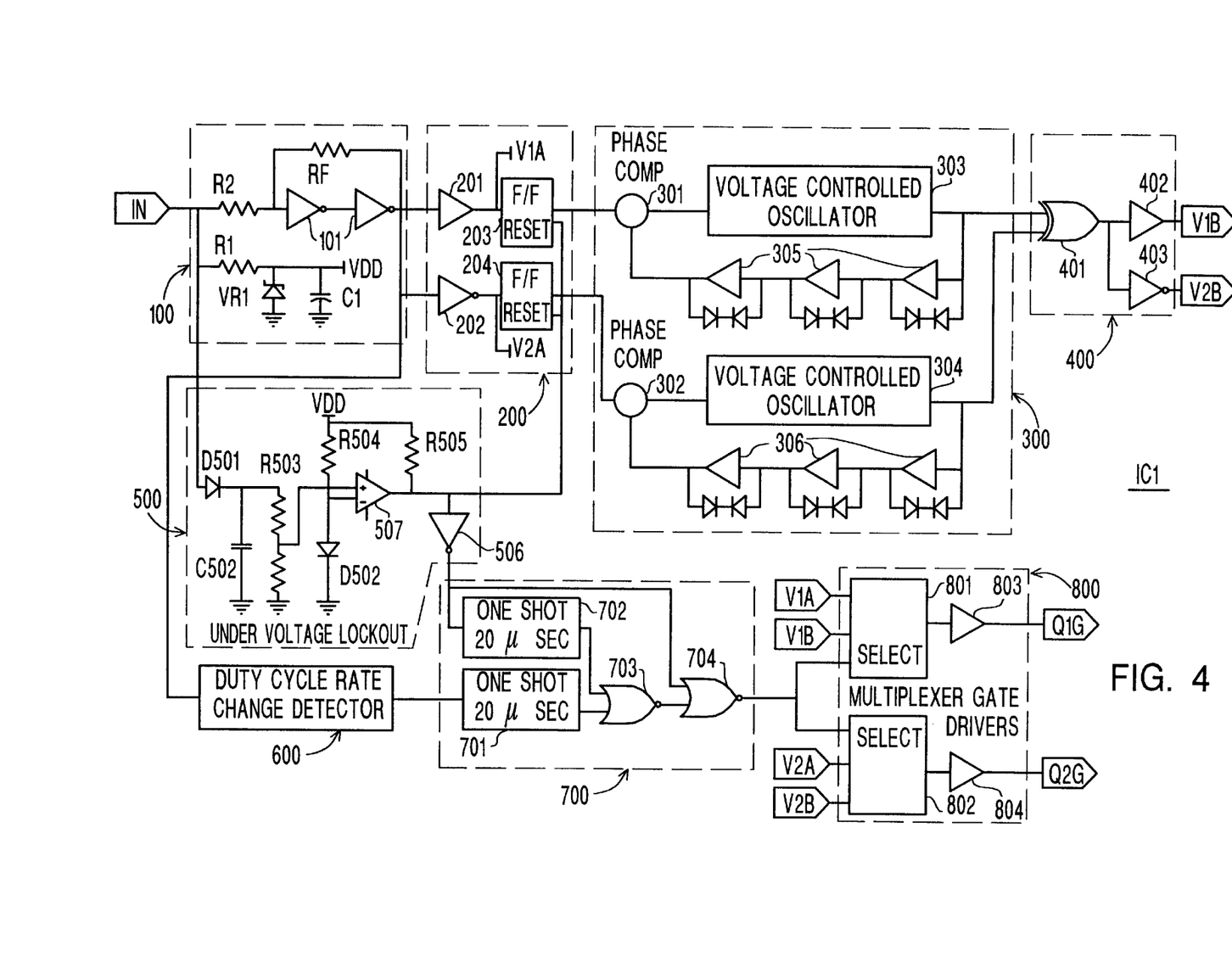
FIG. 4 is a detailed schematic diagram of the gate driving circuit of the power converter of FIG. 3.

Reference is now made to FIG. 4 which is a more detailed schematic diagram of the gate driving circuit IC1 of the power converter 1. The gate driving circuit IC1 includes a Schmitt Trigger circuit 100, a frequency divider circuit 200, a phase-locked loop circuit 300, and a duty cycle reconstruction circuit 400. IC1 also includes a Vdd power supply circuit comprising external resistor R1, zener diode VR1, and external capacitor C1, where R1 is not needed if the signal at the input terminal (IN) is below about 20 VDC.

The Schmitt Trigger circuit 100 is used as a buffer circuit and includes a pair of series coupled inverting amplifiers 101 and a feedback resistor Rf. The trip point of the Schmitt Trigger 100 is set to about ½ of the operating supply voltage (Vdd) and includes a noise margin.

The frequency divider circuit 200 includes two amplifier circuits, one non-inverting 201 and the other inverting 202. The amplifiers receive their inputs from the output of the Schmitt Trigger 100 and are connected to flip-flop circuits 203 and 204, respectively. The flip-flop circuits 203, 204 produce output signals which have frequencies ½ that of the signals from amplifiers 201, 202. The flip-flop outputs have a duty cycle of about 50%. It is important to note that the duty cycle information which was contained in the signal at the IN terminal is transferred to a phase difference between the output signals of the flip-flop circuits 203, 204.

The flop-flop circuits 203, 204 drive the phase-locked loop circuits (PLL) 300. The PLL circuits 300 each respectively include phase comparators 301, 302, voltage controlled oscillators 303, 304, and delay elements 305, 306. The delay elements 305, 306 are formed using amplifiers with diode feedback elements, but other suitable types of delay elements will be apparent to those skilled in the art from the above teaching and are considered within the scope of the invention.

The delay elements 305, 306 in the feedback path of the PLL circuits 300 cause the outputs of the PLL circuits 300 to lead the input signals from the flip-flop circuits 202, 203. The amount of phase lead at the outputs of the PLL circuits 300 may be manually adjusted by changing the number of delay elements 305, 306 or may be automatically and/or externally adjusted using the external capacitor C2 (FIG. 3).

In FIG. 4, the delay elements 305, 306 are shown as buffer circuits having opposing diode feedback circuits. In order to adjust the number of delay elements, the diode feedback circuits may be internally or externally fusible to disable particular delay elements 305, 306.

The duty cycle reconstruction circuit 400 includes exclusive OR (XOR) gates and exclusive NOR (XNOR) gates, shown as a single element 401, and a pair of output amplifiers, one non-inverting 402 and the other inverting 403. The duty cycle reconstruction circuit 400 operates to re-introduce the duty cycle information contained in the phase difference between the output signals from the PLL circuits 300 into the pulse widths of the output signals from the amplifiers 402, 403.

Thus, the duty cycle of the signal on terminal V1A of the frequency divider circuit 200 is the same as the duty cycle of the signal on terminal V1B of the duty cycle reconstruction circuit 400. Similarly, the duty cycle of the signal on terminal V2A of the frequency divider circuit 200 is the same as the duty cycle of the signal on terminal V2B of the duty cycle reconstruction circuit 400.

There is, however, a very important difference between the signals on V1A versus V1B and between the signals on V2A versus V2B. Indeed, the signals on V1B and V2B lead the signals on V1A and V2A, respectively. Thus, when V1B and V2B (as opposed to V1A and V2A) are used to gate the transistors Q1 and Q2, respectively, the transformer delays, noise effects and device switching delays may be compensated for and the precision in switching the synchronous rectifiers may be maintained without reducing converter efficiency.

The gate driving chip IC1 has three modes of operation, namely, the normal mode, the cross coupled mode, and the off mode. In the normal mode, the gate driving signals at Q1g and Q2g (FIG. 3) are derived from the signals on V1B and V2B, respectively. Thus, in the normal mode, the gate driving signals at Q1g and Q2g lead the input signal (IN), i.e., the gate driving circuit IC1 predicts the voltage transitions at the XFRMR secondary winding.

In the cross coupled mode, the gate driving signals at Q1g and Q2g (FIG. 3) are derived from the signals on V1A and V2A, respectively. Thus, in the cross coupled mode, the gate driving signals at Q1g and Q2g do not lead (and may in fact lag) the input signal IN as in the prior art. In the off mode, the transistors Q1 and Q2 are biased off and any commutation currents are conducted by the anti-parallel diodes of the transistors. The off mode is usually invoked during power up of the converter 1 and/or under very low load conditions (like no load).

Details of the transitions between the above-discussed modes are now presented with particular attention paid to the transition between the normal mode and the cross coupled mode.

The PLL circuits 300 have a limited ability to track fast changes in the phase of the input signals from the flip-flop circuits 203, 204. Thus, when the duty cycle of the IN signal changes relatively slowly, the PLL circuits 300 may readily track the change and accurately predict the transitions in the voltage at the XFRMR secondary winding. When the duty cycle of the IN signal changes relatively quickly, however, the PLL circuits 300 may not track the change and may lose phase lock therewith.

Consequently, the gate driving circuit IC1 is designed to transition from the normal mode to the cross coupled mode when the rate of change of the duty cycle of the IN signal exceeds a predetermined threshold. When the rate of change of the duty cycle of the IN signal falls below the predetermined threshold, IC1 transitions back to the normal mode of operation.

Turning again to FIG. 4, in order to accommodate the transitions between operating modes, the gate driving circuit IC1 employs a duty cycle rate change detector circuit 600, a timing circuit 700, and a multiplexing circuit 800. The duty cycle rate change detector circuit 600 operates to produce an output pulse when the rate of change of the duty cycle on the IN terminal exceeds a predetermined threshold. Details on the operation of the duty cycle rate change detector circuit 600 are discussed later.

The output pulse from the duty cycle rate change detector circuit 600 triggers the timing circuit 700 to provide a timed pulse (say 20 µs) to the multiplexing circuit 800. The timing circuit 700 includes a one-shot circuit 701, but other suitable types of timing elements will be apparent to those skilled in the art from the above teaching and are considered within the scope of the invention.

It is noted that the timing circuit 700 includes another one shot circuit 702 which also may trigger the multiplexing circuit 800. The one-shot circuit 702 is driven by an undervoltage lockout circuit 500 which operates to cause the gate driving circuit IC1 to enter the cross coupled mode while the peak amplitude of the voltage on the IN terminal is below a predetermined limit. The undervoltage lockout circuit 500, includes diode D501, storage capacitor C502, resistor divider circuit R503, resistors R504 and R505, diode D502, amplifier 507, and inverting buffer 506. As shown, the undervoltage lockout circuit 500 resets the flip-flops 203, 204 of the frequency divider circuit 200. The operation of the undervoltage lockout circuit 500 is well known in the art and, therefore, is not discussed in more detail herein.

The outputs of the one-shot circuits 701, 702 are combined by way of a so-called glue logic circuit (employing NOR gates 703, 704) such that either circuit 701, 702 may drive the multiplexing circuit 800.

The multiplexing circuit 800 includes a pair of multiplexers 801, 802 and buffer amplifiers 803, 804. The multiplexers 801, 802 receive input signals from the V1A, V1B terminals and the V2A, V2B terminals, respectively. The Q1g and Q2g terminals of IC1 will receive either the signals on terminals V1A, V2A or the signals on terminals V1B, V2B depending on a voltage level and/or edge presented on the select pins of the multiplexers 801, 802. Thus, the gate driving circuit IC1 will enter the cross coupled mode from the normal mode when one or both of the one-shot circuits 701, 702 present a timed pulse to the multiplexers 801, 802 (i.e., the multiplexers 801, 802 select the signals on terminals V1A, V2A in favor of the signals on terminals V1B, V2B). When one or both of the one-shot circuits 701, 702 time out, they will present a voltage level and/or edge to the select pins of the multiplexers 801, 802 which will cause them to select the signals on terminals V1B, V2B in favor of the signals on terminals V1A, V2A (i.e., IC1 will again operate in the normal mode).

Figure 5:
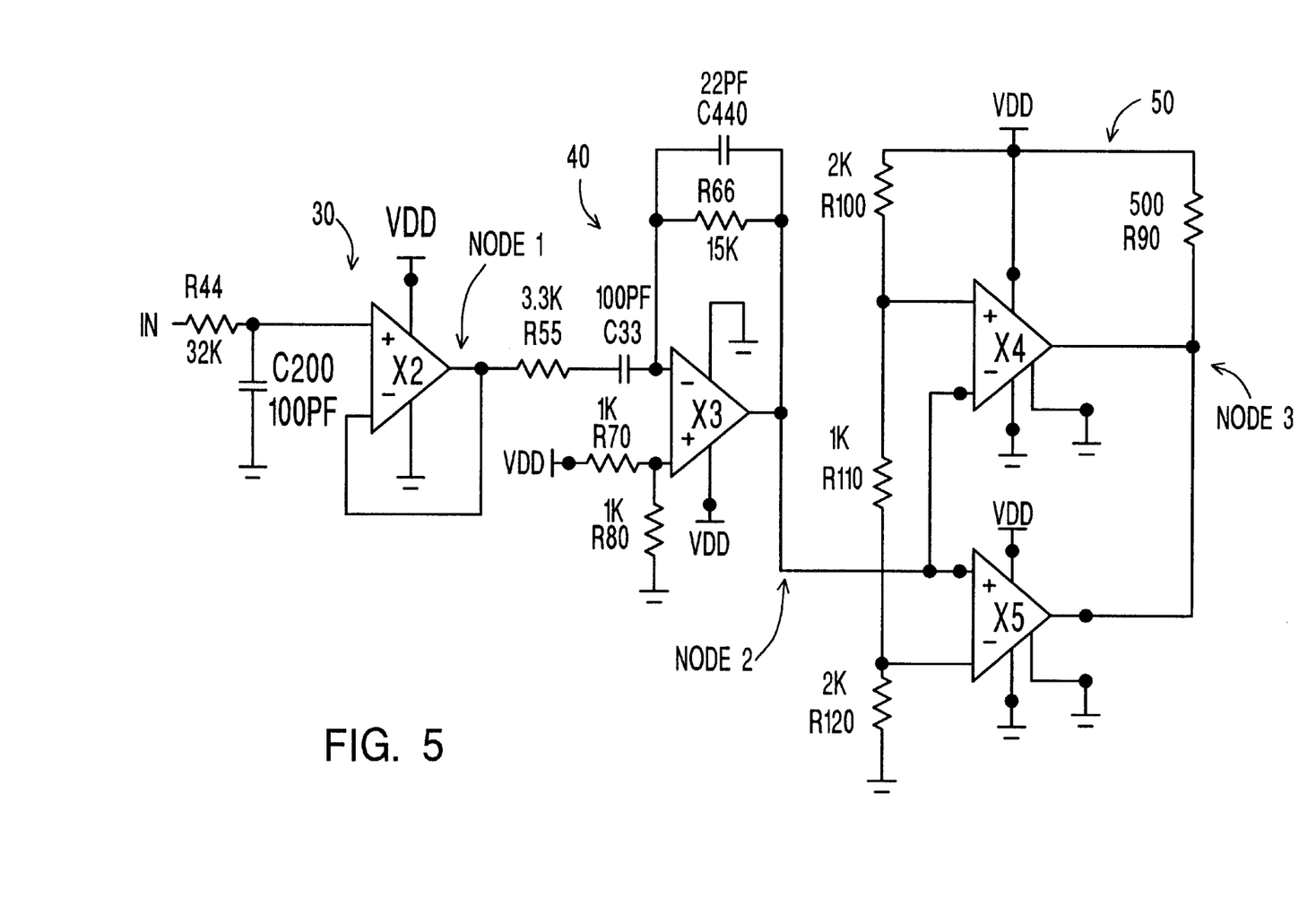
FIG. 5 is a schematic diagram of the duty cycle rate change detector of the gate driving circuit of FIG. 4.

Reference is now made to FIG. 5 which shows a schematic diagram of the duty cycle rate change detector 600 of the gate driving circuit IC1. The duty cycle rate change detector 600 includes a low pass filter circuit 30, a differentiator circuit 40 and a window comparator circuit 50.

The low pass filter circuit 30 includes resistor R44, capacitor C200, and buffer amplifier X2. The corner frequency of the low pass filter 30 is preferably set to 1/10 of the switching frequency of the converter 1 (although other corner frequencies may be selected and still fall within the scope of the invention). The low pass filter produces an output at NODE1 which is proportional to the duty cycle of the waveform at the IN terminal of IC1.

The signal at NODE1 is input to the differentiator circuit 40, which circuit includes the following components: high pass filter circuit elements R55 and C33, offset circuit elements R70 and R80, amplifier X3, and feedback components R66 and C440. The operation of the differentiator circuit 40 is well known to those skilled in the art and, therefore, will not be presented herein. The differentiator, however, outputs a signal at NODE2 which is proportional to the rate of change of the voltage at NODE1. In other words, the voltage at NODE2 is proportional to the rate of change of the duty cycle at the XFRMR secondary winding.

The window comparator circuit 50 includes resistor divider circuit elements R100, R110, and R120, comparators X4 and X5, and pull-up resistor R90. The window comparator circuit 50 outputs a pulse on NODE3 when the absolute value of the amplitude of the voltage at NODE2 exceeds predetermined thresholds.

Figure 6:
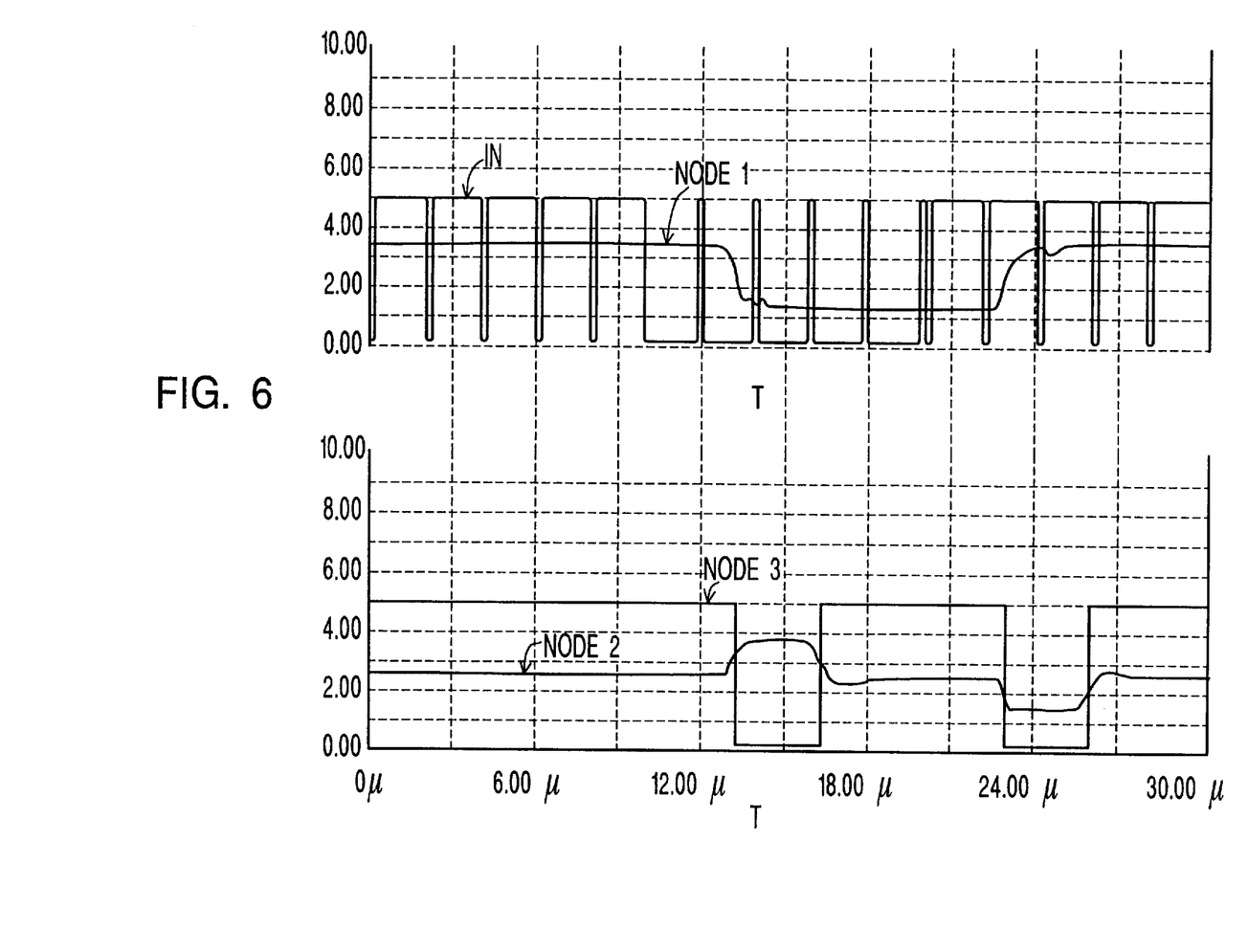
FIG. 6 is a timing diagram showing certain signals of the duty cycle rate change detector of FIG. 5.

Turning to FIG. 6, the timing waveforms of the voltages on the IN terminal, NODE1, NODE2, and NODE3 are shown. As may readily be seen, as the duty cycle of the voltage waveform on the IN terminal rapidly drops (at time=10 µs) the low pass filter circuit 30 responds by lowering the amplitude of the voltage on NODE1 (time=13 µs). The differentiator circuit 40 detects the rate at which the voltage on NODE1 drops and responds by outputting a voltage spike on NODE2 (time=15 µs) having an amplitude proportional to the rate at which the voltage on NODE1 drops. The window circuit 50 detects the amplitude of the voltage on NODE2 and outputs a negatively going square wave pulse on NODE3 corresponding to the voltage spike on NODE2.

It may be seen from FIG. 6 that the window circuit 50 detects a positively going spike on NODE2 (time=15 µs) and a negatively going spike (time=24 µs) which occurs when the duty cycle of the waveform on the IN terminal rapidly increases (time=20 µs). Thus, the absolute value of the amplitude of the voltage spike on NODE2 is detected by the window comparator circuit 50. It is the pulse on NODE3 which triggers the one-shot 701 to produce a timed pulse to the multiplexing circuit 800 described above.

Figure 7:
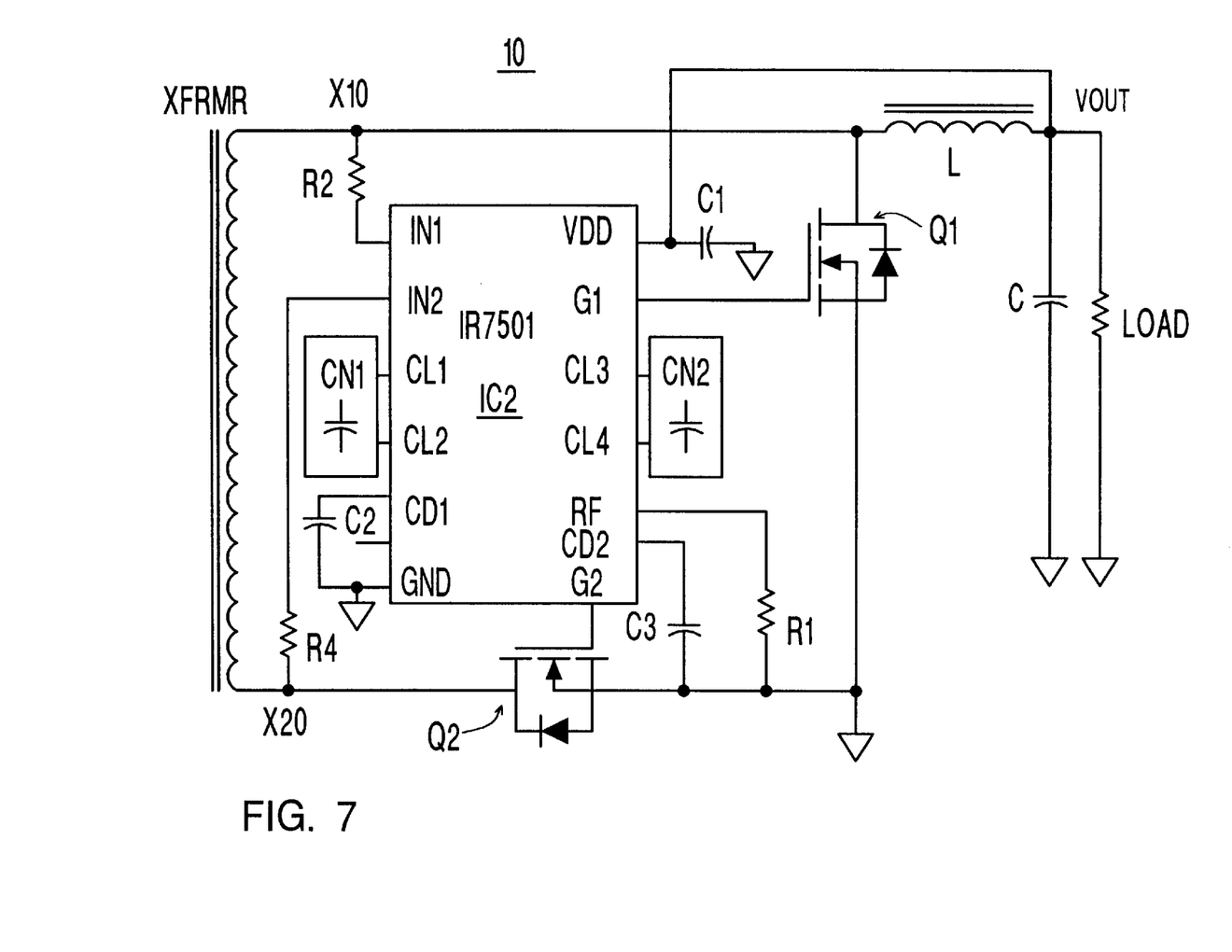
FIG. 7 is a schematic diagram of a power converter employing a synchronous rectifier circuit in accordance with another aspect of the present invention.
Figure 8:
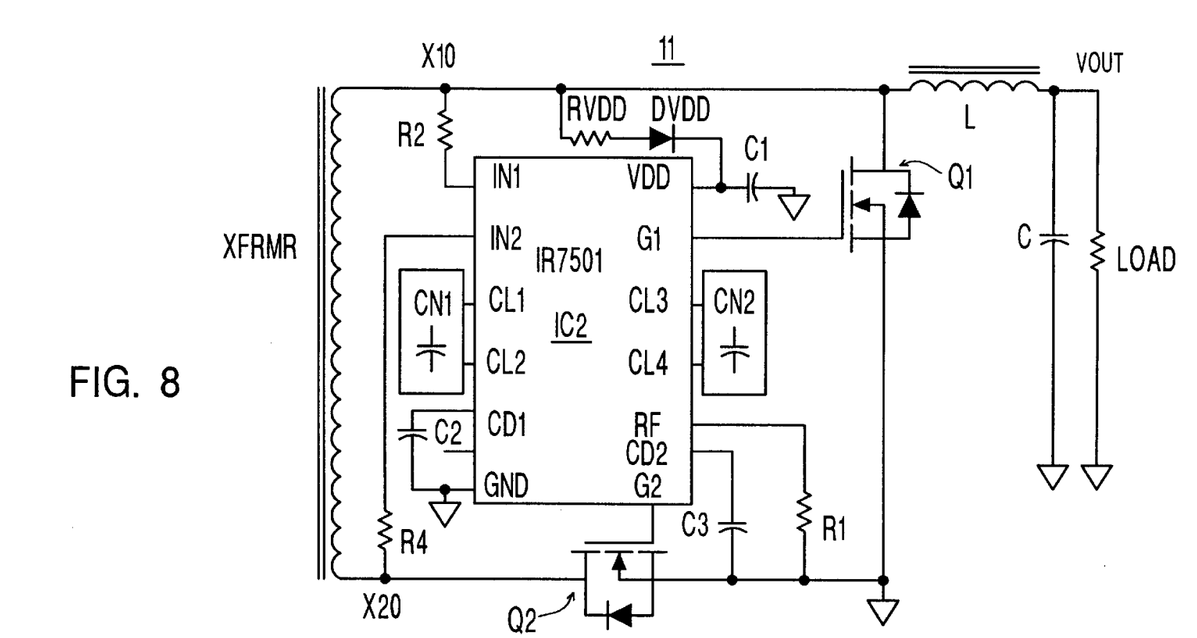
FIG. 8 is a schematic diagram of a power converter employing an alternative embodiment of the synchronous rectifier of FIG. 7.

Reference is now made to FIGS. 7 and 8 which show schematic diagrams of the secondary side circuits of power converters 10 and 11, respectively, which employ synchronous rectifier circuits in accordance with another aspect of the present invention. Power converters 10 and 11 include a pair of MOSFET transistors, Q1 and Q2, used as synchronous rectifiers, which are connected to the secondary windings of a transformer, XFRMR. Each of power converters 10 and 11 also include a gate driving circuit IC2 which has IN1, IN2, CL1, CL2, CL3, CL4, GND, Vdd, CD1, CD2, RF, G1, and G2 terminals and is preferably in integrated form. An integrated circuit suitable for use as IC2 in the power converters of FIGS. 7 and 8 is the IR7501 gate drive circuit which may be obtained from the International Rectifier Corporation, El Segundo, Calif.

Gate drive circuit IC2 receives inputs from the XFRMR windings at nodes X10 and X20 through resistors R2 and R4, respectively, to the IN1, and IN2 terminals. Thus, the power converter circuits 10 and 11 of FIGS. 7 and 8 differ from the power converter circuit 1 of FIG. 3 in that they receive inputs from both ends of the XFRMR windings rather than only one end.

Power converter circuits 10 and 11 operate in substantially the same manner except for how the respective gate drive circuits IC2 receive operating power. Power converter 10 of FIG. 7 receives operating power from the output Vout of the circuit to terminal Vdd, where capacitor C1 provides decoupling and local energy storage for IC2. This configuration is particularly suited for output voltages Vout of between about 2.5 to 5 volts (although even higher output voltages are contemplated, e.g., to 10 volts, 15 volts or higher). IC2 of power converter 11 (FIG. 8) receives operating power from node X10 of the XFRMR winding. The voltage at terminal VDD of IC2 is obtained by rectifying the voltage at node X10 using resistor RVdd and diode DVdd. This configuration is particularly suited to output voltages Vout of between about 1.5 to 2.5 volts.

Figure 9:
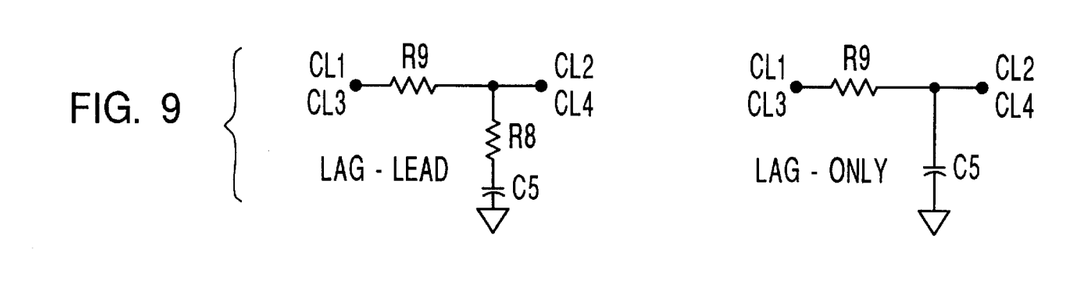
FIG. 9 are schematic diagrams of two filter circuits suitable for use in the power converter of FIGS. 7 and 8.

Circuit components labelled CN1 and CN2 in power converter circuits 10 and 11 represent passive loop filter configurations which may be varied depending on the desired transient response of the circuit. Referring to FIG. 9, two passive loop filter configurations are shown, one being a lag-lead configuration and the other being a lag configuration. It is apparent to those skilled in the art how the circuit component values for R9, R8 and C5 may be adjusted to select a particular transient response for the power converter circuit 10 and/or 11.

Referring again to FIGS. 7 and 8, capacitor C2 is used for adjusting the respective switching frequencies of the power converters 10 and 11. While capacitors C3 and C4 may be provided to adjust an amount of phase lead of the phase-locked loop (described below).

Figure 10:
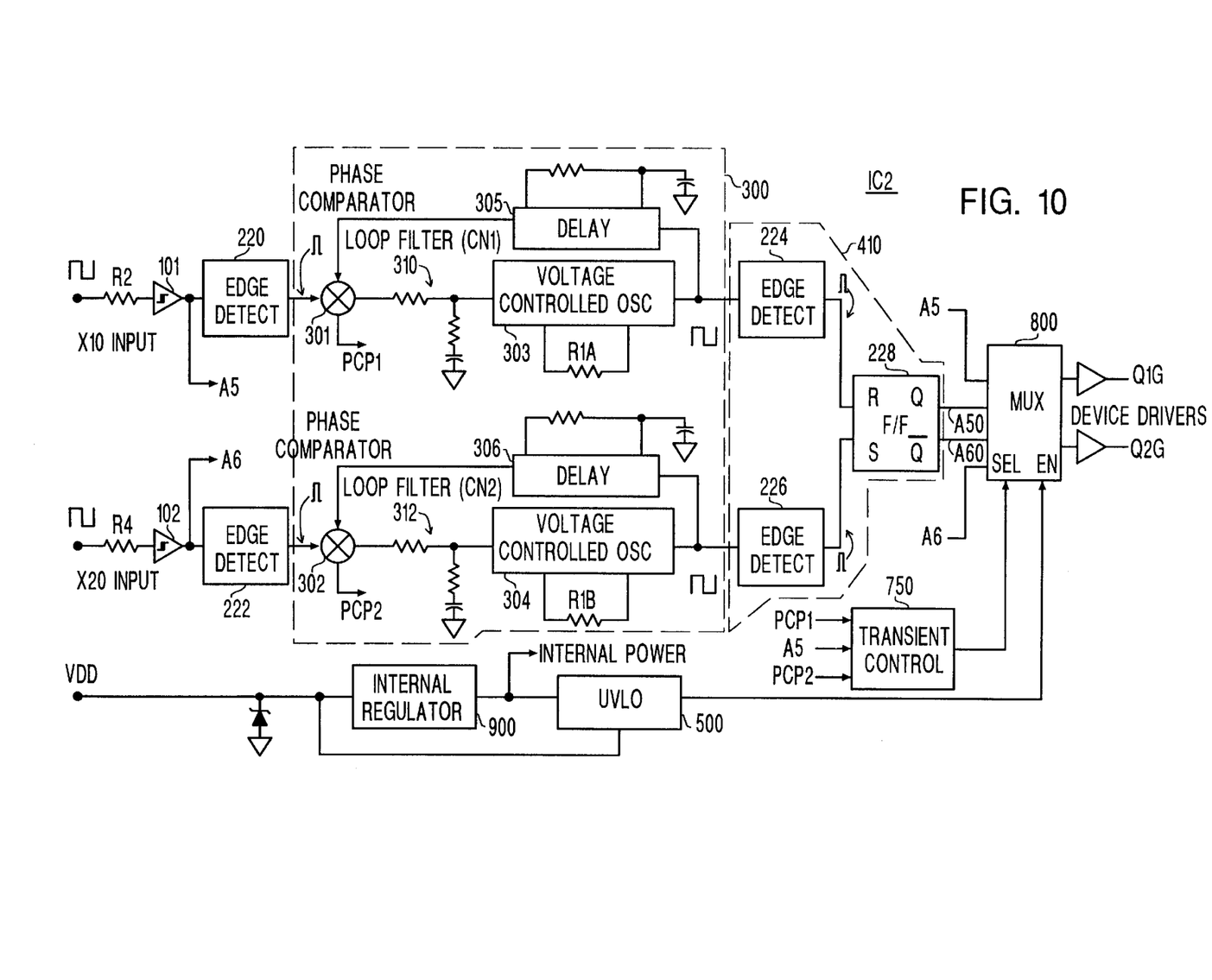
FIG. 10 is a block diagram of the gate driving circuit of the power converter of FIGS. 7 and 8.

Reference is now made to FIG. 10 which shows a circuit block diagram of the gate drive circuit IC2. The gate driving circuit IC2 includes a pair of Schmitt Trigger circuits 101 and 102, a pair of edge detector circuits 220 and 222, a phase-locked loop circuit 300, and an output regeneration circuit 410. In order to accommodate transitions between operating modes (i.e., the normal mode, off mode, and cross coupled mode), the gate drive circuit IC2 also employs a multiplexing circuit (or output select circuit) 800, a transient control circuit 750, and an undervoltage lock-out circuit 500. IC2 also includes a Vdd and Vcc power supply circuit 900 for providing operating power voltage levels for the various circuits in the system.

Figure 11:
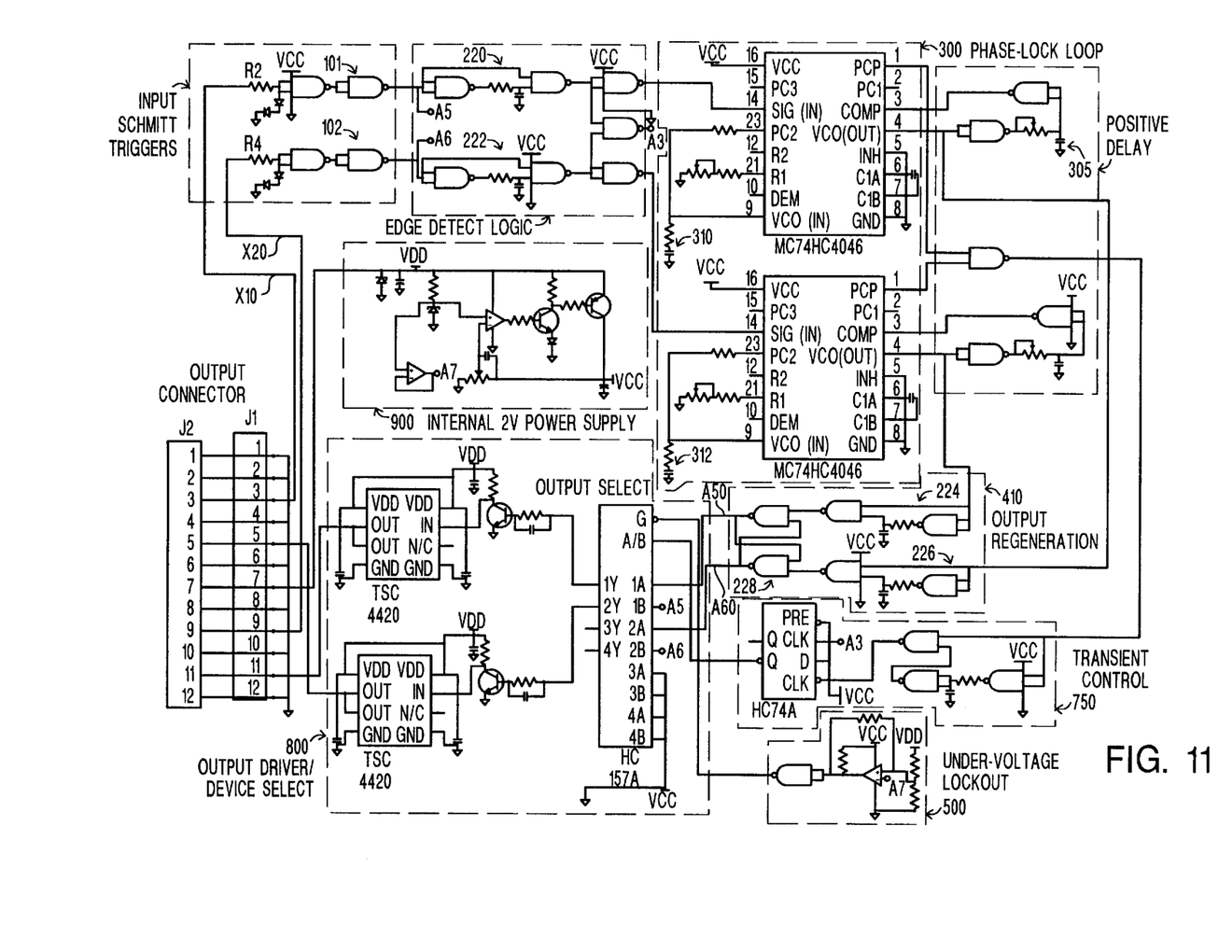
FIG. 11 is a detailed schematic diagram of the gate driving circuit of FIG. 10.

Reference is also made to FIG. 11 which shows a detailed circuit diagram corresponding with the block diagram of FIG. 10. The detailed circuits shown in FIG. 11 are suitable for use in the Schmitt Trigger circuits 101 and 102, the edge detector circuits 220 and 222, the phase-lock loop circuit 300, the output regeneration circuit 410, the output select circuit 800, the transient control circuit 750, the undervoltage lock-out circuit 500, and the power supply circuit 900. It is apparent to those skilled in the art that the specific circuit configurations shown in FIG. 11 are suitable for use in the gate drive circuit IC2 of FIG. 10 but are not the only circuit configurations possible, indeed many other modifications and variations are contemplated and considered within the scope of the invention.

The Schmitt Trigger circuits 101 and 102 receive the XFRMR winding voltages from nodes X10 and X20, respectively, through resistors R2 and R4 and are used as buffer circuits having trip points set to about ½ of the operating supply voltage Vcc. The outputs A5 and A6 of the respective Schmitt Triggers 101 and 102 are input to the edge detector circuits 220 and 222 as well as the multiplexer circuit 800. A suitable circuit implementation for Schmitt Triggers 101 and 102 is shown in FIG. 11.

The edge detector circuits 220 and 222 receive the A5 and A6 outputs, respectively, and convert them into relatively narrow pulses which coincide with the rising edge of the XFRMR winding voltages at nodes X10 and X20, respectively. It is preferred that the pulse widths of the narrow pulses produced by the edge detector circuits 220 and 222 be approximately 50 to 100 nano seconds. The pulse signals from the edge detector circuits 220 and 222 are input to respective phase comparator circuits 301 and 302 of the phase-locked loop circuit 300. The duty cycle information contained in the voltages at nodes X10 and X20 of the XFRMR winding is represented in a phase shift (or time delay) between the pulse signals produced by the respective edge detector circuits 220 and 222. A suitable circuit implementation for the edge detector circuits 220 and 222 is shown in FIG. 11.

The phase-locked loop circuit 300 includes at least two and preferably a pair of phase comparators 301 and 302, voltage controlled oscillators 301 and 304, and delay circuits 305 and 306. As previously discussed, passive loop filters 310 and 312 may be included to adjust the transient response of the phase-locked loop circuits. The respective outputs of the phase-locked loop circuits (i.e., the nodes at the respective right sides of the voltage controlled oscillators 303, 306) are signals having duty cycles of about 50% and having frequencies substantially the same as the respective frequencies of the voltages at nodes X10 and X20 of the XFRMR winding.

Each of the delay circuits 305 and 306 is in a respective feedback path of one of the phase-locked loop circuits and, therefore, cause the outputs of the voltage controlled oscillators 303 and 306 to lead the pulse signals produced by the edge detector circuits 220 and 222. The amount of phase lead at the outputs of the phase-locked loop circuits may be adjusted by the delay circuits 305 and 306. With reference to FIG. 11, the amount of phase lead may be adjusted via potentiometer P2, capacitor C4, potentiometer P3, and/or capacitor C7. It is apparent to those skilled in the art that the delay circuits 305 and 306 may alternatively be implemented using circuits substantially similar to those shown in FIG. 4 if desired. Indeed, other suitable types of delay circuits will be apparent to those skilled in the art from the above teaching and are considered within the scope of the invention.

The output regeneration circuit 410 includes edge detector circuits 224 and 226 coupled to a flip flop circuit 228. Edge detector circuits 224 and 226 sense the respective rising edges of the outputs from the voltage controlled oscillators circuits 303 and 306, respectively, and produce respective pulse signals for input to the flip flop circuit 228. The flip flop circuit 228 reintroduces the duty cycle information contained in the phase difference between the respective pulse signals from the edge detector circuits 224 and 226 into complimentary output signals A50 and A60. Thus, the duty cycle of the signal on line A5 is the same as the duty cycle of the signal on line A50. Similarly, the duty cycle of the signal on line A6 is the same as the duty cycle of the signal on line A60. There is, however, a difference between the signals on lines A5 and A50 and between the signals on line A6 and line A60, namely, the signals on lines A50 and A60 lead the signals on lines A5 and A6, respectively. Thus, when the signals on lines A50 and A60 are used to gate the transistors Q1 and Q2, respectively, the transformer delays, noise effects and device switching delays may be compensated for and the precision in switching the synchronous rectifiers may be maintained without reducing converter efficiency.

The gate driver circuit IC2 has three modes of operation, namely, the normal mode, the cross coupled mode, and the off mode which are the same as the modes of operation of the circuit of FIG. 3. Thus, in the normal mode, the signals on lines A50 and A60 are used to drive transistors Q1 and Q2. In the cross coupled mode, the signals on lines A5 and A6 are used to drive transistors Q1 and Q2, respectively. In the off mode, transistors Q1 and Q2 are biased off.

Transitions between the above modes of operation are facilitated using the multiplexer circuit 800 which receives control signals from the transient control circuit 750 and the undervoltage lock-out circuit 500. The transient control circuit 750 receives signals PCP1 and PCP2 from the respective phase comparator circuits 301 and 302 of the phase-locked loop circuit 300. Signals PCP1 and PCP2 represent the phase difference between the inputs to the phase comparator circuits 301 and 302, respectively, and are relatively narrow pulses (approximately 20 nano seconds) when the phase-locked loop circuits are locked. When the power converter circuit 10, 11 receives a transient (e.g., a rapid duty cycle change) the phase-locked loop circuits become unlocked and the widths of the PCP1 and PCP2 signals increase significantly. The transient control circuit 750 monitors the widths of the PCP1 and PCP2 pulse signals and produces an output which transitions when the width of one or both of the PCP1 and PCP2 pulses exceeds a predetermined value (e.g., approximately 100 to 200 nano seconds). This output controls a select input of the multiplexer circuit 800. Thus, in response to the transitioning output signal from the transient control circuit 750, the multiplexer circuit 800 selects either the signals on lines A50 and A60 or the signals on lines A5 and A6 to drive transistors Q1 and Q2. It is noted that the transient control circuit 750 transitions during a transient condition for only one switching cycle such that transitions between the normal mode and cross coupled mode may be made on a cycle-by-cycle basis. So long as the transient condition persists, however, the transient control circuit 750 will drive the multiplexer circuit 800 such that the power converter 10 or 11 remains in the cross coupled mode. Once the transient condition has cleared, the transient control circuit 750 will control the multiplexer circuit 800 such that the normal operating mode is engaged.

The undervoltage lock-out circuit 500 produces an output signal which enables or disables the multiplexer circuit 800 such that when there is insufficient power to operate the gate driver circuit IC2, the multiplexer circuit 800 is disabled and transistors Q1 and Q2 are biased off (i.e., the power converter 10 or 11 is in the off mode).

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A switching power converter, comprising:
  a switching transformer having a primary winding and a secondary winding, the secondary winding having first and second voltage nodes across which a winding voltage having a phase and a variable duty cycle is impressed;
  a first synchronous rectifier transistor coupled from the first voltage node to a common node;
  a second synchronous rectifier transistor coupled from the second voltage node to the common node; and
  a driver circuit operable to receive the winding voltage and produce first and second drive signals to the first and second synchronous rectifier transistors, respectively, the driver circuit including at least a first phase lock loop circuit operable to receive a signal corresponding to the winding voltage and produce an output signal leading the phase of the winding voltage, the output signal for producing at least one of the first and second drive signals.

2. The switching power converter of claim 1, wherein the first and second synchronous rectifier transistors are metal-oxide-semiconductor (MOS) gated transistors taken from the group consisting of MOS field effect transistors and insulated gate bipolar transistors.

3. The switching power converter of claim 1, wherein the driver circuit includes the first and a second phase lock loop circuit, each operable to receive a signal corresponding to the winding voltage and produce at least respective first and second output signals leading the phase of the winding voltage, the output signals for producing the first and second drive signals, respectively.

4. The switching power converter of claim 1, wherein the first and second phase lock loop circuits include respective delay circuits, each of the delay circuits operable to adjust an amount of delay in the respective phase lock loop circuit which corresponds to the phase lead of the respective output signal.

5. The switching power converter of claim 4, wherein the delay circuits include either fusible elements or an external circuit to adjust the delay of the respective delay circuit, the fusible elements reducing the delay of the respective delay circuit when fused, the external circuit including a resistor and a capacitor, a value of at least one of the resistor and capacitor setting the amount of delay of the respective delay circuit.

6. The switching power converter of claim 1, further comprising a frequency divider circuit operable to receive an input signal having a duty cycle and phase corresponding to the duty cycle and phase of the winding voltage and produce first and second intermediate duty cycle output signals, the first and second intermediate duty cycle output signals having a phase difference corresponding to the duty cycle of the input signal,
  the first and second phase lock loop circuits receiving the first and second intermediate duty cycle output signals to produce the respective first and second output signals.

7. The switching power converter of claim 6, wherein the frequency divider circuit comprises:
  a first non-inverting amplifier receiving the input signal and producing a first non-inverted signal;
  a first inverting amplifier receiving the input signal and producing a first inverted signal;
  a first flip-flop circuit receiving the first non-inverted signal to produce the first intermediate duty cycle output signal; and
  a second flip-flop circuit receiving the first inverted signal to produce the second intermediate duty cycle output signal.

8. The switching power converter of claim 7, further comprising:
  a duty cycle reconstruction circuit operable to receive the respective first and second output signals from the first and second phase lock loop circuits and convert the phase difference between the first and second output signals into a phase leading output signal having a duty cycle substantially equal to the duty cycle of the input signal and a having a phase leading the phase of the input signal;
  a second non-inverting amplifier receiving the phase leading output signal and producing a second non-inverted signal having a duty cycle substantially equal to a duty cycle of the first non-inverted signal and having a phase leading a phase of the first non-inverted signal; and a second inverting amplifier receiving the phase leading output signal and producing a second inverted signal having a duty cycle substantially equal to a duty cycle of the first inverted signal and having a phase leading a phase of the first inverted signal, the second non-inverted signal and the second inverted signal for producing the respective first and second drive signals.

9. The switching power converter of claim 8, further comprising a multiplexing circuit operable to controllably select one of the first and second non-inverted signals and one of the first and second inverted signals to produce the first and second drive signals, respectively.

10. The switching power converter of claim 9, further comprising a selecting circuit operable to: (i) select the first non-inverted signal and the first inverted signal to produce the first and second drive signals, respectively, when the duty cycle of the input signal changes at a rate exceeding a predetermined rate; and (ii) select the second non-inverted signal and the second inverted signal to produce the first and second drive signals, respectively, when the duty cycle of the input signal changes at a rate below the predetermined rate.

11. The switching power converter of claim 10, wherein the selecting circuit includes a timing circuit operable to cause the multiplexing circuit to select the first non-inverted signal and the first inverted signal for the first and second drive signals, respectively, for a predetermined first interval, the first interval commencing when the duty cycle of the input signal changes at a rate exceeding the predetermined rate.

12. The switching power converter of claim 9, further comprising a selecting circuit operable to: (i) select the first non-inverted signal and the first inverted signal to produce the first and second drive signals, respectively, when an amplitude of the winding voltage is below a predetermined value; and (ii) select the second non-inverted signal and the second inverted signal to produce the first and second drive signals, respectively, when an amplitude of the winding voltage is above the predetermined value.

13. The switching power converter of claim 12, wherein the selecting circuit includes a timing circuit operable to cause the multiplexing circuit to select the first non-inverted signal and the first inverted signal for the first and second drive signals, respectively, for a predetermined second interval, the second interval commencing when the amplitude of the winding voltage is below the predetermined value.

14. A switching power converter, comprising:

a switching transformer having a primary winding and a secondary winding, the secondary winding having first and second voltage nodes at which first and second winding voltages are present, the first and second winding voltages each having a phase and a variable duty cycle;

a first synchronous rectifier transistor coupled from the first voltage node to a common node;

a second synchronous rectifier transistor coupled from the second voltage node to the common node; and a driver circuit including at least first and second phase lock loop circuits operable to receive respective signals corresponding to the first and second winding voltages and produce at least respective first and second output signals leading the respective phases of the first and second winding voltages, the first and second output signals for producing the respective first and second drive signals.

15. The switching power converter of claim 14, wherein the first and second synchronous rectifier transistors are metal-oxide-semiconductor (MOS) gated transistors taken from the group consisting of MOS field effect transistors and insulated gate bipolar transistors.

16. The switching power converter of claim 14, wherein the first and second phase lock loop circuits include respective delay circuits, each of the delay circuits operable to adjust an amount of delay in the respective phase lock loop circuit which corresponds to the phase lead of the respective output signal.

17. The switching power converter of claim 14, further comprising:

at least first and second edge detector circuits operable to receive respective first and second input signals each having a duty cycle and phase corresponding to the respective duty cycle and phase of the first and second winding voltages, the first and second edge detector circuits producing first and second intermediate pulse output signals, the first and second intermediate pulse output signals having a phase difference therebetween corresponding to the duty cycles of the input signals, the first and second phase lock loop circuits receiving the first and second intermediate pulse output signals to produce the respective first and second output signals, the first and second output signals having a phase difference therebetween corresponding to the duty cycles of the first and second input signals; and an output regeneration circuit operable to receive the respective first and second output signals from the first and second phase lock loop circuits and convert the phase difference between the first and second output signals into first and second phase leading output signals, each having a respective duty cycle substantially equal to the duty cycles of the respective first and second input signals and a having a respective phase leading the respective phases of the first and second input signals.

18. The switching power converter of claim 17, further comprising an output selecting circuit operable, on a cycle-by-cycle basis, to controllably select (i) the first and second input signals to produce the first and second drive signals, respectively, when the duty cycle of the first or second input signal changes at a rate exceeding a predetermined rate; and (ii) select the first and second phase leading output signals to produce the first and second drive signals, respectively, when the duty cycle of the first or second input signal change at a rate below the predetermined rate.

19. The switching power converter of claim 18, wherein the output selecting circuit is operable to monitor a phase difference of at least one of: (i) the first intermediate pulse output signal and a first delayed signal derived from the first output signal from the first phase-locked loop circuit; and (ii) the second intermediate pulse output signal and a second delayed signal derived from the second output signal from the second phase-locked loop circuit, the output selecting circuit selecting: (i) the first and second input signal to produce the first and second drive signals, respectively, when the monitored phase difference indicates that at least one of the first and second phase-locked loop circuits is out of phase lock.

* * * * *

UNITED STATES PATENT AND TRADEMARK OFFICE
CERTIFICATE OF CORRECTION

PATENT NO. : 6,026,005  
DATED : February 15, 2000  
INVENTOR(S) : Edgar Abdoulin It is certified that error appears in the above-identified patent and that said Letters Patent is hereby corrected as shown below:

Column 10,
Line 16, change "1" to -- 3 --.
Line 30, change "1" to -- 3 --.

Signed and Sealed this

Twelfth Day of November, 2002

Attest:

JAMES E. ROGAN
Attesting Officer      Director of the United States Patent and Trademark Office